United States Patent [19]

Kiuchi

[11] 4,296,295

[45] Oct. 20, 1981

[54] INDUCTION HEATING COIL

[75] Inventor: Mitsuyuki Kiuchi, Minoo, Japan

[73] Assignee: Matsushita Electric Industrial Co., Ltd., Kadoma, Japan

[21] Appl. No.: 133,685

[22] Filed: Mar. 25, 1980

[30] Foreign Application Priority Data

Apr. 4, 1979 [JP] Japan ............................ 54/44205[U]

[51] Int. Cl.³ .............................................. H05B 5/04
[52] U.S. Cl. ........................ 219/10.49 R; 219/10.79; 336/232
[58] Field of Search ............... 219/10.49 R, 10.79, 219/10.75, 10.77, 464; 336/84 R, 205, 223, 232, 60; 13/26

[56] References Cited

U.S. PATENT DOCUMENTS

| | | | |
|---|---|---|---|
| 3,704,357 | 11/1972 | Mouein | 219/10.79 |
| 3,781,503 | 12/1973 | Harnden et al. | 210/10.49 |
| 3,781,504 | 12/1973 | Harnden, Jr. | 219/10.49 |
| 3,786,219 | 1/1974 | Kornrumpf et al. | 219/10.49 |
| 3,786,220 | 1/1974 | Harnden, Jr. | 219/10.49 |
| 3,809,846 | 5/1974 | Baumgartner et al. | 219/10.79 |
| 3,814,888 | 6/1974 | Bowers et al. | 219/10.49 |
| 4,029,926 | 6/1977 | Austiw | 219/10.49 |
| 4,092,511 | 5/1978 | Austiw | 219/10.49 R |

*Primary Examiner*—Volodymyr Y. Mayewsky
*Attorney, Agent, or Firm*—Wenderoth, Lind & Ponack

[57] ABSTRACT

An improved flat induction heating coil for a cooking apparatus of the type in which an electrically conductive cooking utensil is heated according to the principle of electromagnetic induction. To provide a substantially uniform magnetic flux density distribution in the induction coil constituting a part of the cooking apparatus and, hence, a uniform temperature distribution across the bottom of the cooking utensil, a refractory insulating material is wound adjacent inner turns of the coil to provide a comparatively larger winding pitch for said inner turns than for outer turns. This arrangement makes for a flattened temperature profile and eliminates an uneven cooking of food.

4 Claims, 6 Drawing Figures

INDUCTION HEATING COIL

BACKGROUND OF THE INVENTION

1. Field of the Invention

This invention relates to an induction heating coil. More particularly, this invention relates to an induction heating coil for a cooking appliance of the induction heating type.

2. Description of the Prior Art

A cooking appliance of the induction heating type is generally of the construction illustrated in FIGS. 1 and 2. Thus, a commercial power supply is transformed into a high frequency electric current of, say, about 20 KHz by means of an inverter circuit 1 such as a transistor or thyristor and this high frequency electric current is fed to a flat induction heating coil 2. Alternately, without the above-mentioned transformation into a high frequency electric current, the low frequency current is directly fed to the flat induction heating coil. When an electrically conductive cooking utensil 4 is placed on such an induction heating coil 2 through an interposed insulating top plate 3 which may for example be made of ceramic material, the resulting magnetic flux traversing through said electrically conductive utensil 4 generates an electromotive force in the utensil 4, whereby an eddy current is induced. This eddy current and the resistance of the utensil generate a thermal energy, whereby the food contained in the utensil 4 is heated. This direct heating of a cooking utensil by such magnetic flux offers several advantages over other heat sources such as firewood, gas, oil and an electric heater. Thus, induction heating involves only a fraction of heat loss and provided a high heat efficiency without a waste of energy, thus contributing considerably to the conservation of energy. Furthermore, since it does not involve a high-temperature heat source such as a burning firewood, gas or oil or an electric heater, induction heating is a heating means which can be safely handled even by the child and aged person without fear of a burn or fires. The absence of a high-temperature heat source means, also, that cooking with an induction heating appliance does not elevate the temperature of the ambient atmosphere, nor does it require a supply of air for combustion. The above things mean that the atmosphere in the room is not spoiled by cooking.

Thus, a cooking apparatus of the induction heating type offers a number of advantages over the conventional cooking devices. However, the prior art cooking appliance of induction heating type employs a flat circular coil of conductor metal. The solid metal conductor is an inexpensive material but since it is subject to a high frequency skin effect, a coil wound at a close pitch entails a large energy loss and, hence, provides only a low heat efficiency. To avoid such loss of energy, the coil must be wound with a gap between turns but in order to provide a given energy output, such a loose coil must have an increased outside diameter as compared with a coil wound at a close pitch, thus detracting from the compactness of the heating unit. A loosely wound coil has the additional disadvantage of low output per unit area.

To obviate the above-mentioned disadvantages of a solid metal conductor, it has been proposed to fabricate an induction heating coil from the so-called litz wire which is actually a plurality of fine-gage metal wires twisted together. The litz wire is characterized in that it entails only a small energy loss even when wound with a close pitch and makes for the manufacture of a small induction coil, thus contributing to a reduced size of the heating unit. Moreover, since this coil material does not present any problem even when wound at a loose pitch, one is almost at liberty to select any suitable coil size.

However, if such a litz wire is wound at a fixed pitch, i.e. with equal gaps between turns, there occurs the problem that the magnetic flux density is high in an inner area of the coil and low in the outer or peripheral area, with the result that the heating unit presents an uneven temperature profile such that a relatively high temperature prevails in said inner area and a relatively low temperature is available in the peripheral area. Since the foregoing means that the central area of the bottom of a cooking utensil is heated to a higher temperature than is the peripheral area of the bottom, the coil wound at a fixed pitch has the drawback that, in baking a cake in a pan, for example, only the central area of the cake is done well.

FIG. 3 shows a typical temperature distribution for the prior art induction heating coil of litz wire as wound at a uniform pitch. It will be seen that the temperature is lower at the inner turns of the coil, with the highest temperature occuring at Ro which is displaced a short distance from the inside diameter $r_1$ of the coil toward its outside diameter. This is because the magnetic flux density is highest in the neighborhood of Ro and this condition entails an increased high frequency loss of the coil 2, an increased temperature buildup in the coil itself and, hence, a waste of energy.

OBJECTS AND SUMMARY OF THE INVENTION

It is, therefore, a first object of this invention to provide an induction heating coil for a cooking apparatus of induction heating type, which provides a uniform temperature distribution across the bottom of a cooking utensil.

It is another object of this invention to provide an induction heating coil with a reduced high frequency loss and, hence, a reduced loss of energy and free from an abnormal temperature buildup in the coil itself.

The induction heating coil according to this invention is manufactured by winding a litz wire into a flat coil with an insulating material interposed adjacent inner turns of said coil so as to increase the winding pitch of the litz wire at the inner turns with respect to outer turns. The above construction ensures a uniform magnetic flux density distribution over the entire face of the coil and, accordingly, a uniform temperature distribution across the bottom of the cooking utensil.

The induction heating coil of this invention will be described below in further detail, reference being had to the accompanying drawings.

DETAILED DESCRIPTION OF THE INVENTION

Figure 1:
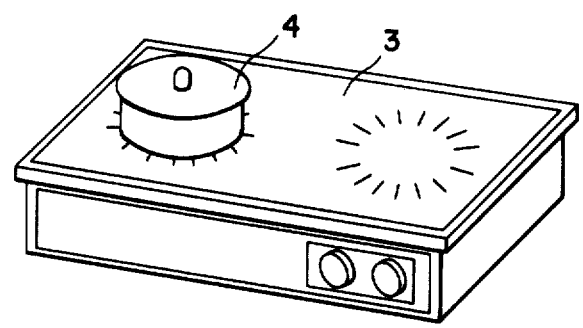
FIG. 1 is a perspective view showing a cooking appliance.
Figure 2:
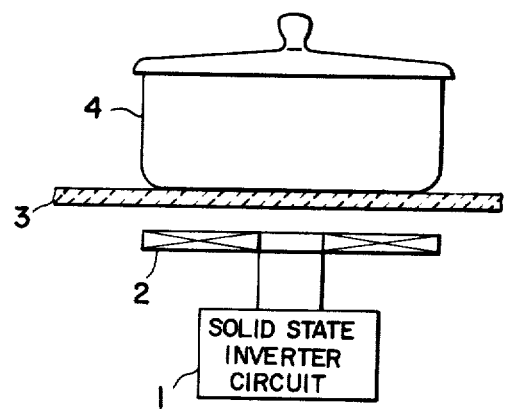
FIG. 2 is a cross-sectional elevation of the principal part of said appliance.
Figure 3:
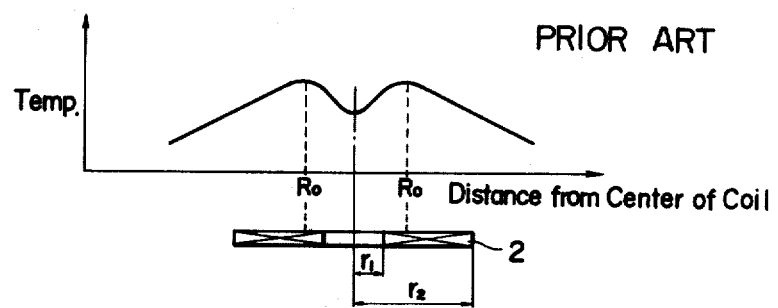
FIG. 3 is a diagram showing the temperature characteristic of the prior art induction heating coil used in a cooking appliance.
Figure 4:
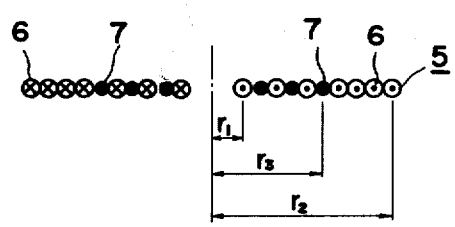
FIG. 4 is a cross-sectional elevation view of the induction heating coil for a cooking appliance, which is in accordance with this invention.
Figure 5:
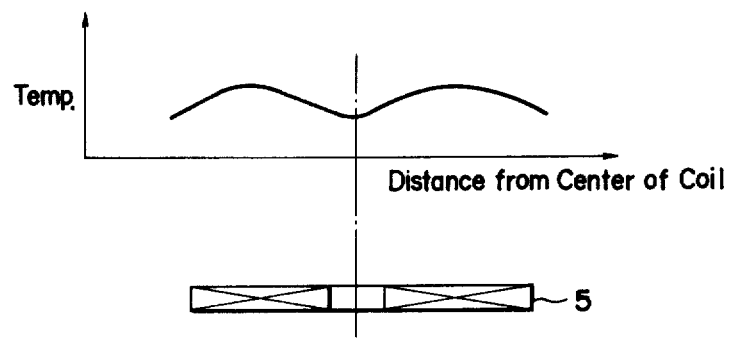
FIG. 5 is a diagram showing the temperature characteristic of the induction heating coil depicted in FIG. 4.

A preferred embodiment of this invention is described below with reference to the accompanying drawings. In FIG. 4, there is a cross-sectional elevation view showing an induction heating coil according to this invention. This induction heating coil 5 is manufactured by winding a litz wire 6 into a flat coil with a continuous strip of refractory insulating material 7 wound adjacent inner turns of the litz wire. By the above interposition of insulating material 7, the winding pitch of litz wire 6 is substantially increased, by an amount equal to the width of the insulating strip, so that the magnetic flux density per unit area can be reduced in the neighborhood of the inside diameter of the coil. The insulating material 7 is preferably a continuous strip or ribbon having a diameter equal to that of litz wire 6, for such a strip does not produce an uneven surface in the coil unit and is easy to wind in the manufacturing process.

In order that the above insulating material 7 may function to the best advantage, it is desirably wound adjacent inner turns of litz wire inwardly of a position corresponding to approximately one-third to one-half of the outside diameter of the coil 5 as measured from the outer edge thereof. Specifically, the insulating material 7 may be wound advantageously starting at $r_3 = (r_1 + r_2)/2$ [wherein $r_1$ and $r_2$ are the inside and outside diameters of induction heating coil 5] and progressing in an inward direction.

The contemplated effect cannot be attained fully when the diameter of this insulation winding is too small, while an excessively large insulation diameter results in an increased size of the induction heating coil unit and may provide only a temperature distribution similar to that of the conventional coil.

While a variety of materials may be used for the above insulating material 7, a preformed ribbon of asbestos yarn, glass yarn or Nomex Tape (the registered trademark of E. I. Du Pont de Nemours Co.) are noted as examples.

Figure 6:
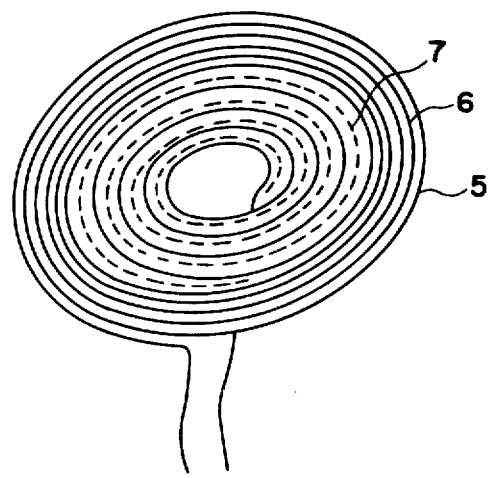
FIG. 6 is a perspective view of the coil illustrated in FIG. 4.

FIG. 6 is a perspective view of the induction heating coil according to this invention, showing the insulating material 7 wound only adjacent the inner turns of the litz wire coil 6. Because the insulating material 7 and litz wire 6 can be wound simultaneously, the manufacturing of the coil is facilitated. Moreover, since the winding pitch of litz wire 6 is exclusively dictated by the size (diameter) of insulating material, a uniform winding is assured with higher accuracy than it is the case when a mere open space is provided between turns without the interposition of insulating material.

Having thus described this invention, the present inventors now claim as their invention as recited in the appended claims.

What is claimed is:

1. A flat spiral wound induction heating coil of inner and outer pitch for a cooking appliance of the induction heating type which comprises a coil winding of litz wire having inner and outer turns, the outer turns being directly adjacent with each other and having a substantially uniform pitch, and a strip of electrically insulating material which is wound along between and adjacent to only said inner turns of said coil winding of litz wire so as to provide a comparatively larger, substantially uniform winding pitch for said inner turns of litz wire than the pitch of said outer turns thereof and thereby providing a uniform temperature distribution across the bottom of the cooking appliance.

2. A flat induction heating coil as set forth in claim 1 wherein the winding of said insulating material has a diameter not more than about one-half of the outside diameter of the induction heating coil.

3. A flat induction heating coil as set forth in claim 1 wherein said insulating material is made of a member selected from the group consisting of glass, asbestos and resin.

4. An induction heating coil as set forth in claim 1 wherein said insulating material and litz wire are substantially equal in outer diameter.

* * * * *